United States Patent [19]

Dickie et al.

[11] Patent Number: 4,686,576

[45] Date of Patent: Aug. 11, 1987

[54] CONDUCTIVE SCREEN FOR VIDEO DISPLAY UNIT

[75] Inventors: Robert G. Dickie, New Market; Martin E. Hobbins, Richmond Hill, both of Canada

[73] Assignee: Northern Technologies, Ltd., Markham, Canada

[21] Appl. No.: 840,393

[22] Filed: Mar. 17, 1986

[51] Int. Cl.[4] .......................... H04N 5/65; H04N 5/72

[52] U.S. Cl. .................................... 358/245; 358/253; 358/247

[58] Field of Search ............... 358/247, 252, 253, 254, 358/245; 313/476; 174/35 MS

[56] References Cited

U.S. PATENT DOCUMENTS 4,246,613 1/1981 Choder et al. ...................... 358/253

4,412,255 10/1983 Kuhlman et al. .................. 358/252

*Primary Examiner*—Edward L. Coles, Sr.
*Attorney, Agent, or Firm*—Woodcock Washburn Kurtz Mackiewicz & Norris

[57] ABSTRACT

A conductive screen for a video display unit. In particular, this invention discloses an electromagnetic interference ("EMI") shielding device for a video display unit and methods for making the same. This invention relates to an EMI shielding device which an electrically conductive screen is in electrically conductive contact with the face of a cathode ray tube also eliminating the build up of static electricity therefrom. The conductive screen and faceplate of the video display unit are held in contact with the cathode ray tube by the bezel of the cathode ray tube housing.

3 Claims, 3 Drawing Figures

CONDUCTIVE SCREEN FOR VIDEO DISPLAY UNIT

CROSS REFERENCE

This application is related by subject matter to co-pending application Ser. No. 833,771 filed 2/18/86, which is incorporated herein by reference.

BACKGROUND OF THE INVENTION

This invention relates to an electromagnetic interference ("EMI") shielding device for a video display unit ("VDU") and methods for making the same. More particularly, this invention relates to an EMI shielding device in which an electrically conductive transparent screen is in electrically conductive contact with the "face" or viewing surface of the cathode ray tube and the electrically conductive cabinet.

It is well known that operation of a cathode ray tube results in a build up of static electricity on the face or display portion of the cathode ray tube. This build up of static electricity causes a disadvantageous accumulation of foreign particles on the faceplate of the video display unit as well as the VDU operator. In addition, it is advantageous to provide an antiglare treatment for the viewing surface of VDU displays. Antiglare treatments are typically accomplished by causing the outermost viewing surface to have a slight texture (non flat) surface. In many applications, this antiglare feature is achieved by mechanically or chemically etching a textured surface into the viewing face of the cathode ray tube itself. This process may be relatively expensive. In other antiglare applications, a texture is imparted to a faceplate of rolled plastic which may be sold separate from the VDU as a feature added by the user.

It has recently become known that EMI shielding may be provided by knitted or woven wire mesh which is fully laminated between glass and/or plastic substrates. For example, see the brochure by Chomerics entitled "Chomerics Optical Products", date unknown. While this may be effective means for reducing EMI and the build up of static electricity on the face of a video display unit, shielding of this type is typically for military/aerospace application and it requires relatively complex manufacturing procedures.

SUMMARY OF THE INVENTION

Accordingly, it is an object of the present invention to provide a cost effective means for providing EMI shielding to a VDU.

It is another object of this invention to eliminate static electricity on the CRT viewing surface and the operator.

It is a still further object of this invention to enhance video image quality by providing a mechanical antiglare surface over the face of the VDU display surface which provide electrical shielding.

Accordingly, one aspect of this invention comprises a conductive screen over the face of a cathode ray tube and a non-laminated transparent faceplate between the bezel of the cathode ray tube housing and the face of the cathode ray tube, said faceplate holding and electrically connecting the conductive screen to the conductive cabinet of the VDU.

Another aspect of this invention comprises placing a conductive screen over the face of a cathode ray tube, placing the faceplate on the screen, folding the screen over the edge of the faceplate, and electrically and mechanically securing the bezel of the cathode ray tube housing to the faceplate.

Furthermore, the outermost surface of the faceplate has a non-flat textured surface to diffuse light and control glare.

DESCRIPTION OF THE PREFERRED EMBODIMENT

The Apparatus

Figure 1:
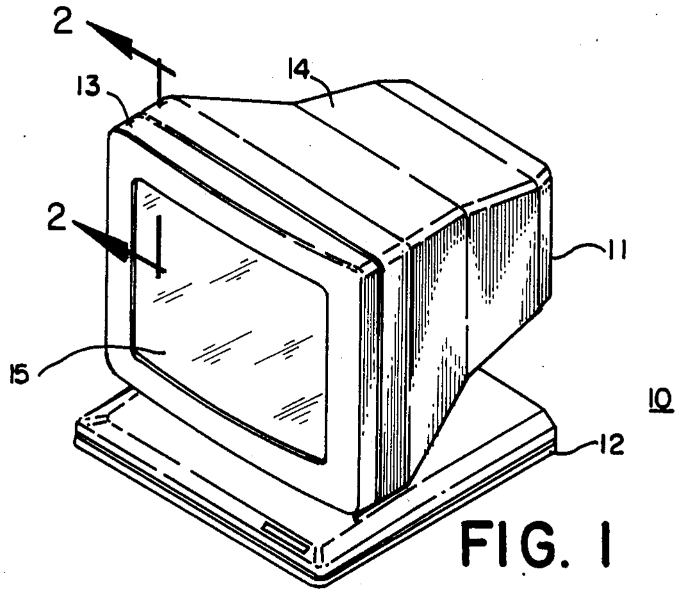
FIG. 1 is a perspective view of a video display unit made according to this invention.

Referring now to FIG. 1, the video display unit, generally designated as 10, according to one embodiment of this invention is shown. Monitor housing 11 is seen mounted to monitor base 12. Bezel 13 is mounted to the main portion 14 of housing 11. Faceplate 15 covers the viewing surface of the cathode ray tube and is held in position by bezel 13.

Figure 2:
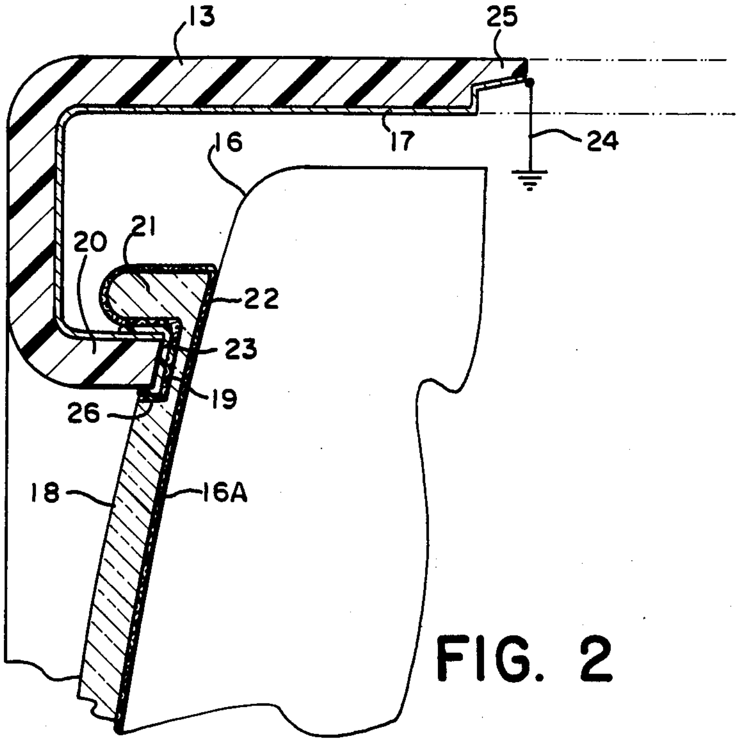
FIG. 2 is a cross sectional view substantially along the lines 2—2 of FIG. 1.

Referring to FIG. 2, the details of the EMI shielding for cathode ray tube 16 according to one embodiment of this invention are shown. FIG. 2 shows the upper left hand corner of video display monitor 10 in a magnified view so that the details according to this invention are more clearly illustrated. According to one embodiment of this invention, the inner surface of bezel 13 is covered with a conductive coating 17. In the preferred embodiment of this invention, electrically conductive coating 17 is anyone of several well known electrically conductive paints applied to the inner surface of bezel 13.

As seen in FIG. 2, the face of cathode ray tube 16 is covered by faceplate 18. The faceplate 18 is any material well known in the art suitable for viewing the image projected upon the display surface of CRT 16. For example, a transparent plastic faceplate may be used. A grooved portion 19 of faceplate 18 extends 360° around the periphery of faceplate 18 and is sized to be slightly larger than the ridge portion 20 of bezel 13. In the preferred embodiment, ridge 20 extends 360° around the periphery of bezel 13. Groove 19 defines a first ledge 21 adjacent to the periphery of the faceplate and a second ledge 26 closer to the center of the faceplate than the first ledge. Ridge 20 mates with groove 19 and grips conductive screen 22 so as to hold it in place. Conductive screen 22 is firmly held in conductive contact with the face 16A of CRT 16 by the back portion of faceplate 18. In the preferred embodiment, conductive screen 22 is a woven wire mesh which readily allows passage of the image projected onto the face of CRT 16 therethrough. In the most preferred embodiment of this invention, conductive screen 22 is a woven wire mesh comprising a matrix of small openings having a diameter of approximately one thousandth of inch. These openings are spaced such that there is approximately one hundred openings per linear inch or approximately ten thousand openings per square inch. Woven wire mesh of this configuration is available from Unique Wire Weaving Company of Hillside, New Jersey. The edge portion of conductive screen 22 wraps around ledge 21 of faceplate 18 and is gripped in general by groove 19 and in particular by ledges 21 and 26. It will be appreciated by those skilled in the art that the interaction of groove 19 of faceplate 18 and ridge 20 of bezzel 13 constitute an advantageous feature of one embodiment of this invention. It will also be appreciated that the objectives of this invention may also be achieved by embodiments of this invention which do not utilize the groove/ridge mating. For example, the entire forward face of faceplate 18 may be relatively flat, in which case conductive screen 22 simply folds over the edges of the faceplate and is held in place by a relatively flat portion of bezzel 13. Conductive adhesive may also be advantageously used in an embodiment such as this wherein adhesive is applied between faceplate 18 and conductive screen 22; and/or between bezzel 13 and conductive screen 22.

In the preferred embodiment of this invention, the layer of wire mesh 22 in the area of groove 18 between ledge 21 and ledge 26 of faceplate 18 is mechanically trapped by ridge 20 of bezel 13. The conductive coating 17 of bezel 13 is in electrically conductive contact with screen 22 by this mechanical contact. In addition, a layer 23 of electrically conductive adhesive or glue is located between the wire mesh 22 in groove 19 and ridge 20 of bezel 13. Thus, ledges 21 and 22 not only serve to stabilize ridge 20 within groove 19, but also to retain the glue within the groove. In addition glue layer 23 not only serves to insure that conductive screen 22 is firmly gripped to faceplate 18 and to bezel 13, but also that high quality electrically conductive contact is maintained between conductive screen 22 and conductive coating 17 on the inside surface of bezel 13. In the preferred embodiment of this invention conductive adhesive is utilized. It is also possible to eliminate the need for adhesive by increasing the integrity on the mechanical fit between the faceplate and the bezel.

It will appreciated by those skilled in the art that a video display unit configured as described above provides a cost effective means for preventing the build up of static electricity from the surface of cathode ray tube 16. In particular, any electrostatic charge which builds up on the face 16A of cathode ray tube 16 is conducted through the conductive screen to adhesive layer 23. Conductive adhesive layer 23 in turn provides a path for electron flow to conductive layer 17 on the inside surface of bezel 13. As indicated by the GROUND symbol marked 24 in FIG. 2, conductive coating 17 is grounded according to any means well known in the art. For example, in many applications the interior of the main portion 14 of housing 11 is coated with a coating similar to conductive coating 17. When bezel 13 is mounted to the main portion 14 of housing 11, the coating 17 on rear ledge 25 will contact the coating on the interior of main housing 14. The coating on the interior of main housing 14 will in turn be grounded according to any means well known in the art. In this way, any excess electrons which build up on the surface 16A of cathode ray tube 16 will be conducted to ground as described above. In one embodiment of this invention, a plastic injection molding process for manufacturing faceplate 18 is used. It has been discovered that the molding tool used in this process can be configured so as to advantageously impart a texture to the surface of faceplate 18. By molding faceplate 18 with a texture surface comprising consistent irregularities, an antiglare EMI shield is economically produced. In a preferred embodiment, the irregularities may comprise shallow pockmarks one to two thousandth of an inch deep.

The Method

Figure 3:
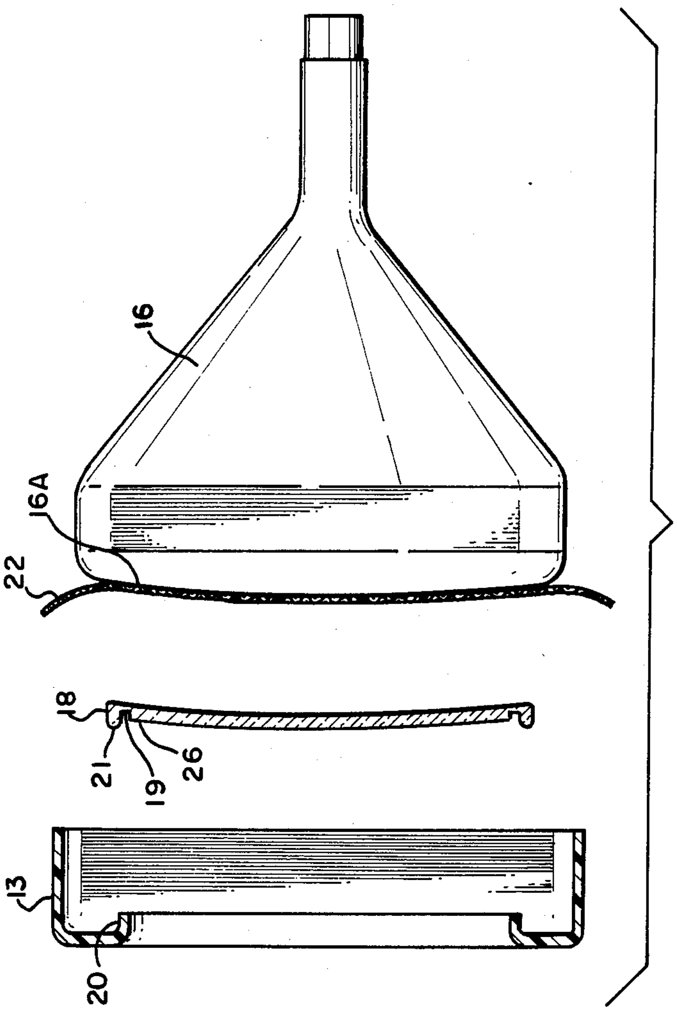
FIG. 3 is an exploded elevation view showing the CRT, mesh screen, faceplate, and bezel in a pre-assembly position according to a method of this inventions.

Referring now to FIG. 3, the method for providing an EMI shielded cathode ray tube according to this invention is disclosed. In the preferred embodiment of this invention, a conductive screen 22 is provided which has a larger extent than the viewing area of cathode ray tube 16. Conductive screen 22 is then placed firmly and tautly over the viewing surface of cathode ray tube 16. In the preferred embodiment of this invention, it is desirable to insure that no impurities or dust particles exist between conductive screen 22 and cathode ray tube 16. With conductive screen 22 stretched into intimate contact with the viewing surface 16A of cathode ray tube 16, faceplate 18 is placed or pressed into intimate contact with the outer surface of conductive screen 22. The edges of screen 22 are then folded over the ends of faceplate 18. In the preferred embodiment of this invention, the conductive screen 22 is folded over the ends of faceplate 18, around ledge 21, and into groove 19. In one embodiment of this invention, adhesive or glue is applied to that portion of conductive screen 22 which is contained within groove 19, as shown in FIG. 2. Bezel 13 is then moved over faceplate 18 and holds the folded-over portion of screen 22 against the forward facing portion of faceplate 18. In the preferred embodiment of this invention, ridge 20 of bezel 13 mates with groove 19 and holds or grips the folded over portion of screen 22 thereto.

Although particular embodiments of this invention have been described in detail for purposes of illustration, it will appreciated that various modifications are within the spirit and scope of this invention. The appended claims are intended to cover all such modifications.

What is claimed is:

1. In a video display unit of the type including a cathode ray tube and a housing for said cathode ray tube having a bezel with an opening for viewing the face of said cathode ray tube, the improvement comprising:

a faceplate through which the face of said cathode ray tube can be viewed;

a conductive screen between said faceplate and the face of said cathode ray tube;

a groove around the periphery of said faceplate on the outside surface thereof, said groove containing at least a portion of said screen; and a ridge on said bezel mating with the groove in said faceplate for holding said screen and for electrically connecting said screen to said bezel.

2. The improved video display unit recited in claim 1 further comprising:

a ledge on one side of said groove adjacent the periphery of the faceplate, the ridge on said bezel gripping said screen against one side of said ridge and the bottom of said groove in said faceplate.

3. The improved video display unit recited in claim 1 further comprising:

a second ledge on the other side of said groove, said screen being glued in said groove with said ledges retaining the glue in said groove.

* * * * *